United States Patent [19]

Kawamura

[11] Patent Number: 5,533,252
[45] Date of Patent: Jul. 9, 1996

[54] SLOT INSULATOR GUIDE IN ASSEMBLY OF DYNAMOELECTRIC MACHINE AND COIL INSERTING APPARATUS PROVIDED THEREWITH

[75] Inventor: Tsutomu Kawamura, Yokkaichi, Japan

[73] Assignee: Kabushiki Kaisha Toshiba, Kawasaki, Japan

[21] Appl. No.: 394,819

[22] Filed: Feb. 27, 1995

[30] Foreign Application Priority Data

Sep. 29, 1994  [JP]  Japan ..................... 6-234773

[51] Int. Cl.$^6$ ..................... H02K 15/10
[52] U.S. Cl. ..................... 29/734; 29/736
[58] Field of Search ............. 29/734, 736, 732, 29/596, 598

[56] References Cited

U.S. PATENT DOCUMENTS

| | | |
|---|---|---|
| 3,968,556 | 7/1976 | Morr ..................... 29/734 |
| 5,060,364 | 10/1991 | Scherer ..................... 29/734 |
| 5,231,324 | 7/1993 | Kawamura et al. . | |

FOREIGN PATENT DOCUMENTS

| | | |
|---|---|---|
| 61-45732 | 12/1986 | Japan . |
| 3-65109 | 10/1991 | Japan . |
| 4-156245 | 5/1992 | Japan . |
| 4-178133 | 6/1992 | Japan . |
| 4-289744 | 10/1992 | Japan . |

Primary Examiner—Carl E. Hall
Attorney, Agent, or Firm—Cushman Darby & Cushman

[57] ABSTRACT

A slot insulator guide used with a coil inserting apparatus for guiding a layer insulator and a wedge having different sizes from each other toward each slot of a stator core of a dynamoelectric machine. Both side faces of the guide include a first guide face for guiding a layer insulator and a second guide face for guiding the wedge. The first guide face is parallel to its axis while the second guide face is inclined. The first guide face has in its distal end an inclined face. Each guide face has a first engaging portion with which the end of a layer insulator is engaged. Each guide face further has in its distal end a second engaging portion with which the ends of the wedge are engaged. Each engaging portion extends toward the slot. A coil inserting apparatus with which the guides are used has a first and a second stepped portions. The pusher is abutted against the layer insulator and the wedge so that the layer insulator and the wedge are pushed. The first and second stepped portions are formed to be spaced from each other in a direction in which the layer insulator and the wedge are inserted in the slot.

5 Claims, 12 Drawing Sheets

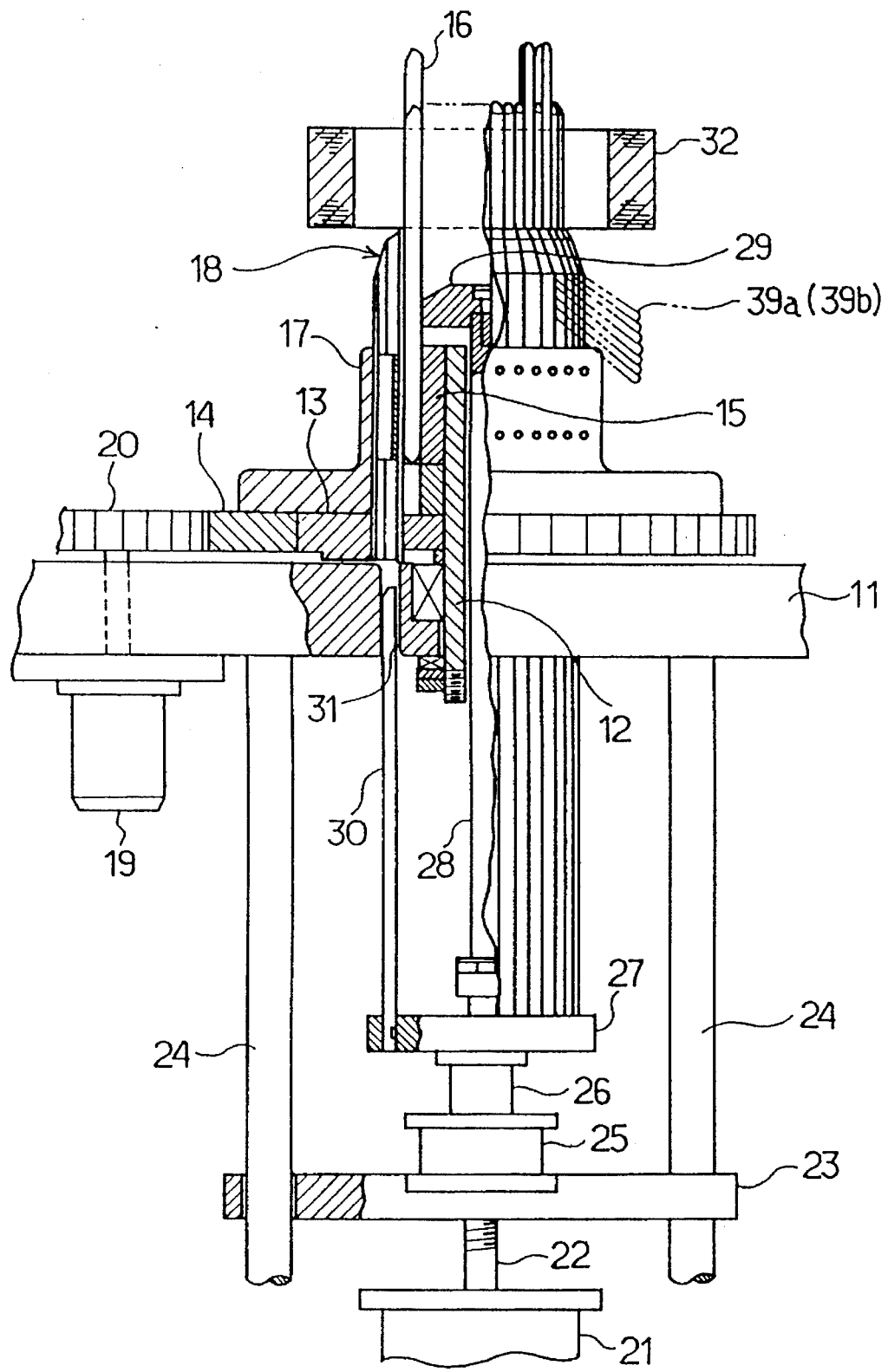
F I G. 2

5,533,252

SLOT INSULATOR GUIDE IN ASSEMBLY OF DYNAMOELECTRIC MACHINE AND COIL INSERTING APPARATUS PROVIDED THEREWITH

BACKGROUND OF THE INVENTION

1. Field of the Invention

This invention relates to a coil inserting apparatus inserting slot insulators such as wedges and layer insulators together with coils into slots of a stator core of a dynamoelectric machine and further to a guide provided in such a coil inserting apparatus for guiding the wedges and the layer insulators in the direction of the slots of the stator core.

2. Description of the Prior Art

The prior art has provided dynamoelectric machines having a stator core comprised of a concentric double-layer winding in which upper and lower coils are accommodated in each slot of the stator core. In such a concentric double-layer winding, a wedge is inserted into each slot to be disposed in the vicinity of its open end so that the coils are prevented from falling out of the slot. Furthermore, a layer insulator is inserted into each slot to be disposed between the coils. The prior art has also provided automatic coil inserting apparatuses which automatically insert slot insulators such as the wedge and the layer insulator together with the coils. One of such coil inserting apparatuses is provided with a guide guiding the wedge and the layer insulator to each slot of the stator core.

The wedges have the same size as the layer insulators in small dynamoelectric machines. In medium-sized and large-scale dynamoelectric machines, however, the depth of each slot is increased as compared with the small dynamoelectric machines. Accordingly, the length and the width of each of the wedge and the layer insulator differ in the medium and large dynamoelectric machines. In view of the difference in the sizes of the wedge and the layer insulator, the prior art coil inserting apparatus has been provided with guides in accordance with various sizes of the wedges and layer insulators. The wedges and the layer insulators are guided to the slots by the guides suitable for them in size. However, the guides need to be replaced by one after another depending upon the sizes of the wedges and the layer insulators and the replacement cannot improve the working efficiency.

SUMMARY OF THE INVENTION

Therefore, an object of the present invention is to provide a slot insulator guide used for guiding slot insulators such as a layer insulator and a wedge in a coil inserting apparatus which inserts the wedges and the layer insulators each having different sizes into slots of a stator core of a dynamoelectric machine, together with coils.

Another object of the present invention is to provide a coil inserting apparatus provided with a slot insulator guide guiding wedges and layer insulators each having different sizes to slots of a stator core of a dynamoelectric machine and pushers which are adapted to insert the wedges and layer insulators both held on the guides into predetermined locations in the slots in a single movement step.

To achieve the first and other objects, the present invention provides a slot insulator guide used with a coil inserting apparatus. The slot insulator guide comprises a guide face including a first and a second guide faces formed in each of sides thereof so as to be located at the bottom side of each slot and at the open end side of each slot respectively in the state that a plurality of the guides are disposed to correspond to a plurality of blades provided in the coil inserting apparatus respectively, and a first and a second engaging portions formed in each of the sides of the slot insulator guide so as to be located at the bottom side of each slot and so as to extend longitudinally of each slot. The layer insulator is held between the opposite first guide faces of the guide and the adjacent guide with both edges of the layer insulator being engaged with the first engaging portions of the guides and the adjacent guide respectively. The wedge is held between the opposite second guide faces of each guide and the adjacent guide with both edges thereof being engaged with the second engaging portions of the guide and the adjacent guide respectively. The layer insulator and the wedge are guided by the respective first and second guide faces and the respective first and second engaging portions so as to be moved toward the slots of the stator core when the layer insulator and the wedge are pushed by pushers provided in the coil inserting apparatus.

According to the above-described construction, each guide can be applied to the layer insulator and the wedge having different sizes from each other. Consequently, since the guides need not be replaced according to the sizes of the layer insulator and the wedge, the efficiency of a coil inserting work can be improved.

The guide may have an inclined face formed in the distal end of the first guide faces and an inclination of the inclined face is set in a range of 10 to 30 degrees. Insertability of the slot insulators and the coils can be prevented from being lowered by the guides.

To achieve the second and other objects, the present invention provides a coil inserting apparatus for inserting a layer insulator and a wedge together with a coil into each of slots of a stator core of a dynamoelectric machine. The apparatus comprises a plurality of blades arranged in a space at a predetermined interval equal to a pitch of slots formed in a stator core of a dynamoelectric machine and holding a coil. Each slot has a bottom and an open end opposite to the bottom. A stripper is disposed to be reciprocally moved in a space encircled by the blades. Stripper driving means is provided for moving the stripper so that the coil is pushed by the stripper from the blades into the slot. A plurality of guides are disposed so as to correspond to the blades respectively. Each guide has two guide faces formed in both sides thereof respectively. Each guide face includes a first and a second guide faces formed in each of sides thereof so as to be located at the bottom side of each slot and at the open end side of each slot respectively. Each guide face includes a first and a second engaging portions formed at the bottom side of each slot to extend longitudinally of each slot. The layer insulator is held between the opposite first guide faces of the guide and the adjacent guide with both edges thereof being engaged with the first engaging portions of the guide and the adjacent guide respectively. The wedge is held between the opposite second guide faces of the guide and the adjacent guide with both edges thereof being engaged with the second engaging portions of each guide and the adjacent guide respectively. A plurality of pushers are arranged so as to be reciprocally movable and so as to correspond to the blades respectively. The pushers are moved so that the layer insulator and the wedge are pushed into each slot. Each pusher has a first stepped portion formed at a predetermined position to abut against and push the layer insulator and a second stepped portion formed at a position different from the location of the first stepped portion in a direction of movement thereof to abut against and push the wedge. Pusher driving means is provided for moving the pushers.

The layer insulator and the wedge are pushed by the pushers when the pushers are moved by the pusher driving means, so that the layer insulator and the wedge are guided by the respective first and second guide faces and the respective first and second engaging portions so as to be moved toward the slots of the stator core.

According to the above-described coil inserting apparatus, the layer insulator and the wedge having different sizes from each other can be inserted into the slot by a single movement of the pusher. Consequently, the number of steps for insertion of the layer insulators, the wedges and the coils can be reduced and accordingly, the efficiency of the coil inserting work can be improved. Furthermore, the improvement in the efficiency of the coil inserting work can readily be achieved by the provision of the stepped portions in each pusher.

It is preferable that an amount of projection of each of the first and second engaging portions is set to be approximately equal to the thickness of each of the layer insulator and the wedge. Consequently, the resistance of movement applied to the coil during the insertion can be reduced.

BRIEF DESCRIPTION OF THE DRAWINGS

Other objects, features and advantages of the present invention will become clear upon reviewing the following description of preferred embodiments thereof, made with reference to the accompanying drawings, in which:

FIG. 2 is a partially broken side view of the coil inserting apparatus;

DESCRIPTION OF THE PREFERRED EMBODIMENTS

Figure 1:
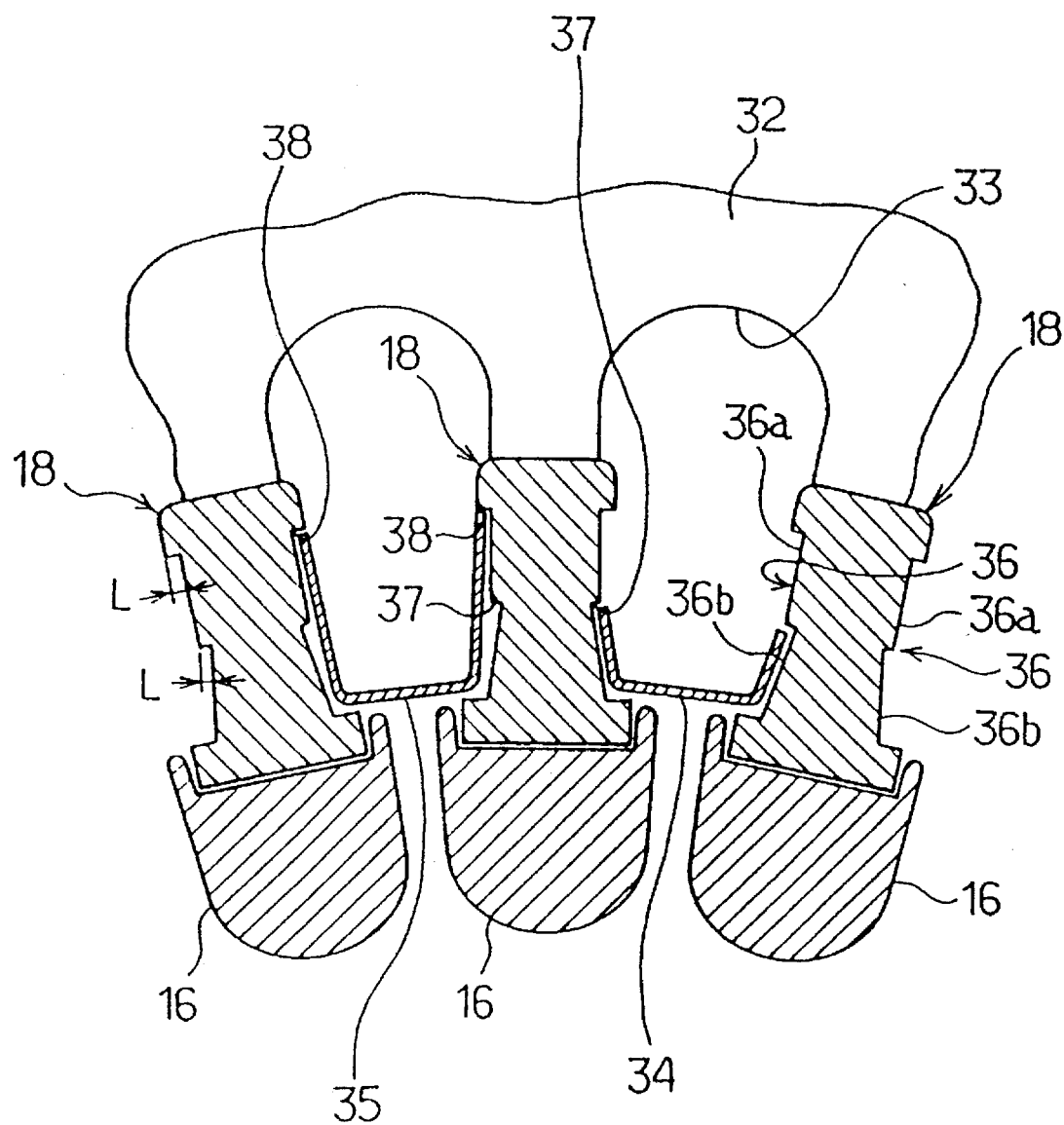
FIG. 1 is an enlarged longitudinally sectional bottom view of guides of a coil inserting apparatus of a first embodiment in accordance with the present invention.

A first embodiment of the present invention will be described with reference to FIGS. 1 to 7. Referring first to FIG. 2, an automatic coil inserting apparatus of the first embodiment is shown. The apparatus comprises a base 11 and a hollow rotary cylinder 12 rotatably mounted on the base 11 so as to stand therefrom. A rotary disc 13, a driven gear 14 and a blade holder 15 are associated with the rotary cylinder 12. The driven gear 14 is fitted with the rotary disc 13 so as to be substantially integral therewith. A plurality of blades 16 are held by the blade holder 15 into a circular arc arrangement at a pitch equal to a slot pitch of a stator core 32 of a dynamoelectric machine (not shown). A guide ring 17 is attached to the rotary disc 13. A plurality of slot insulator guides 18 are fixedly mounted on the guide ring 17 so as to be located outside the blades 16. An electric motor 19 is mounted on the base 11. Rotation of the motor 19 is transmitted via a pinion 20, the driven gear 14 and the rotary disc 13 to the rotary cylinder 12 and the guide ring 17, so that the latter two are turned pitch by pitch. Consequently, each one of the blades 16 and each one of the guides 18 are located so as to correspond to one of the slots of the stator core 32, and one of the slots is selected as the one into which coils, a wedge and a layer insulator are to be inserted.

A cylinder 21 is mounted on a stationary portion below the base 11 and includes a movable rod 22 on which a carriage 23 is mounted so as to be vertically movable along guide rods 24. A sub cylinder 25 is mounted on the carriage 23. The sub cylinder 25 includes a movable rod 26 on which a support 27 is mounted. A push rod 28 is mounted on the upper central portion of the support 27, extending vertically through the rotary cylinder 12. A stripper 29 is mounted on the upper end of the push rod 28. A plurality of pushers 30 stand on the outer peripheral portion of the support 27. The pushers 30 extend through holes 31 formed in the base 11 such that the distal end of each pusher 30 is opposed to a space between each guide 18 and the adjacent one so as to pass therethrough. In a coil inserting step, the stator core 32 is fixed by a suitable locking or fixing means (not shown).

The guides 18 will be described in detail with reference to FIGS. 1 and 3. The height of each guide 18 is set to be approximately one half of the depth of each slot 33. Each of opposite side faces of the guide 18 serves as a guide face 36 guiding the slot insulator to the slot 33. Each guide face 36 includes a first guide face 36a which is generally parallel to its axis and corresponds to the bottom side of the slot 33 and a second guide face 36b which is inclined relative to its axis such that the width thereof is gradually reduced toward the bottom of the slot and corresponds to the open side of each slot 33.

Each guide face 36 has a plurality (two in the embodiment) of engaging portions or stepped portions 37 and 38 having different heights from each other. The engaging portions 37 and 38 extend along the direction in which a wedge 34 and a layer insulator 35 are inserted into the slot 33. An amount of projection of the engaging portions 37 and 38 projecting from the respective guide faces 36a and 36b is set to be approximately equal to the thickness of each of the wedge 34 and the layer insulator 35. Both edges of the wedge 34 are engaged with the engaging portions 37 of the guide 18 and the adjacent one. Both edges of the layer insulator 35 are engaged with the engaging portions 38 of the guide 18 and the adjacent one.

Figure 3:
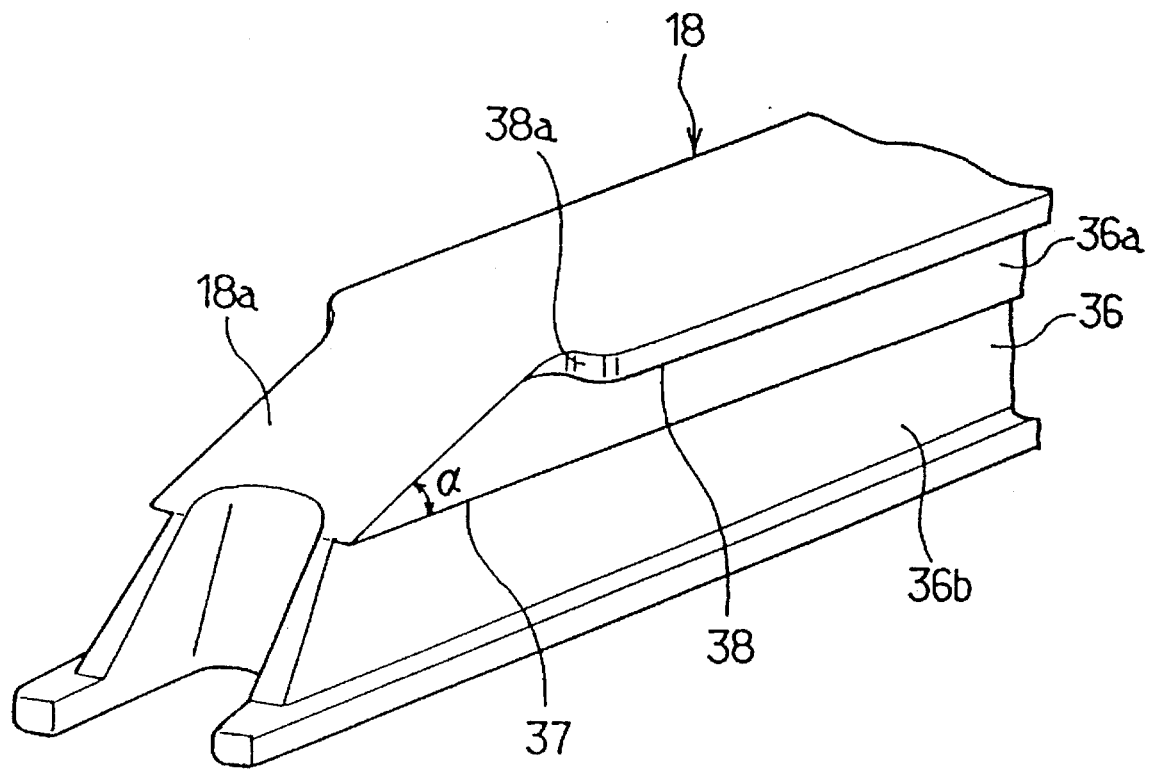
FIG. 3 is a perspective view of a distal end portion of the guides of the coil inserting apparatus.
Figure 4:
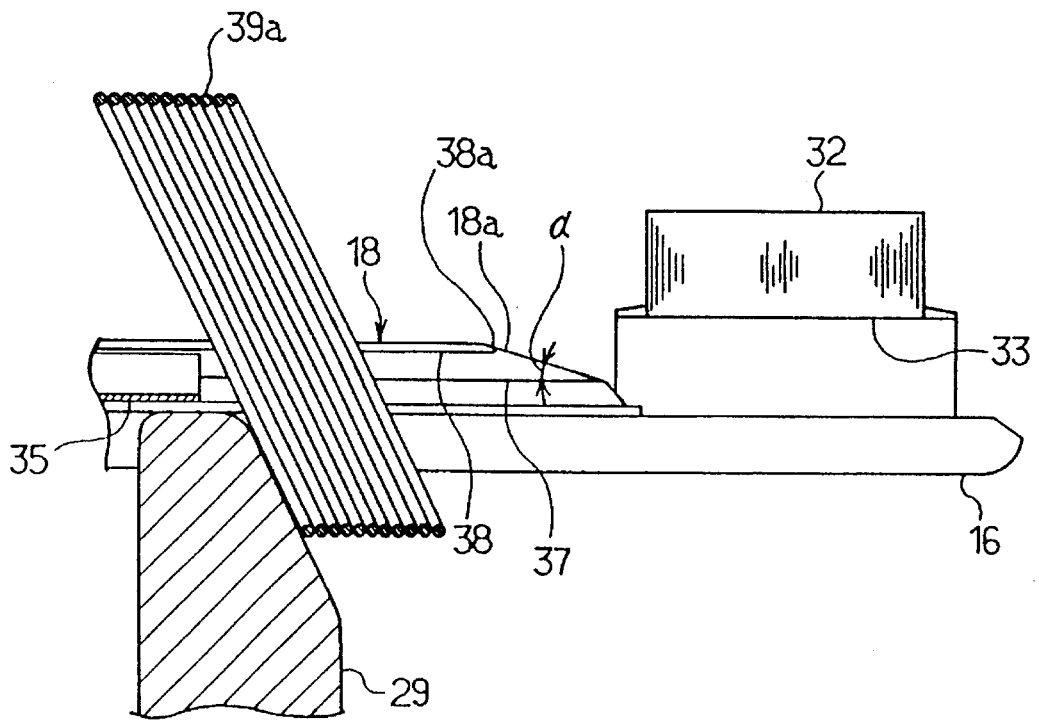
FIG. 4 is a longitudinally sectional side view of part of the coil inserting apparatus, showing a step in the procedures for insertion of a coil and a slot insulator by the coil inserting apparatus.
Figure 5:
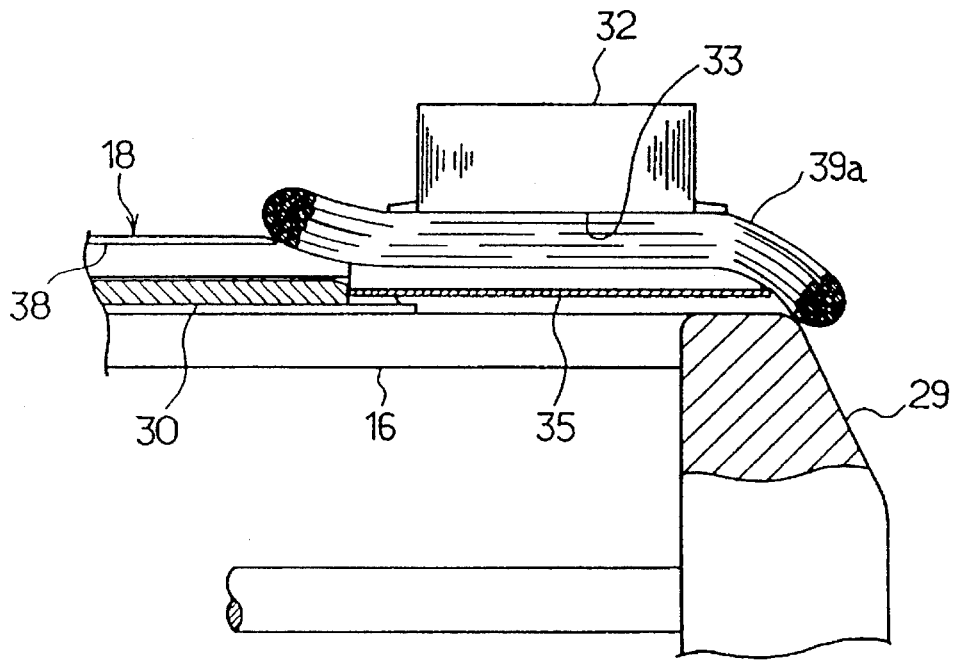
FIG. 5 is a longitudinally sectional side view showing a step subsequent to that shown in FIG. 4.

The distal end of each guide 18 at the side of the first guide face 36a includes an inclined face 18a, as shown in FIGS. 3 and 4. The inclination α of each inclined face 18a is set to be in the range of 10 to 30 degrees. The distal end of each guide 18 at the side of the second guide face 36b is also inclined, and the inclination thereof is larger than that of the inclined face 18a.

Figure 13:
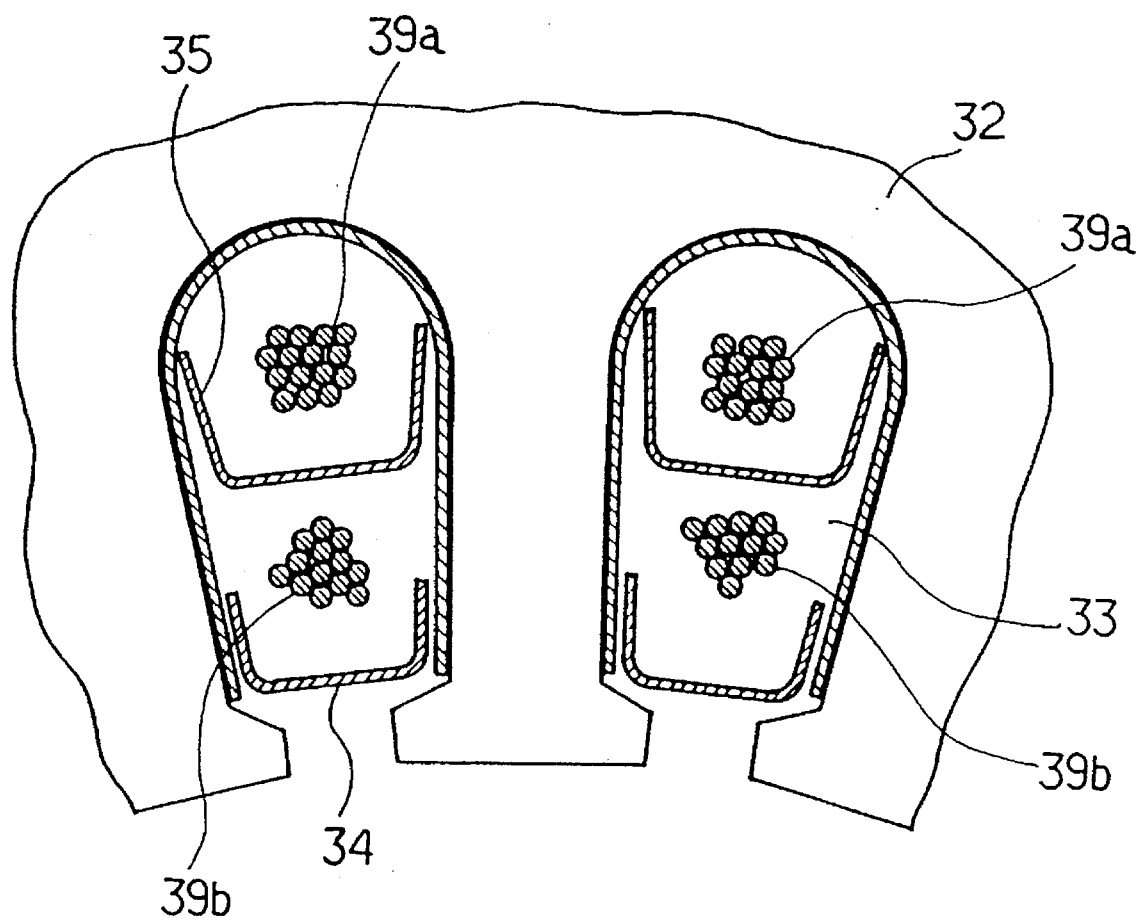
FIG. 13 is a partial longitudinal section of a stator core of a dynamoelectric machine, showing two of the slots in each of which the coils, wedge and layer insulator are inserted by the coil inserting apparatus of the first embodiment.
Figure 14:
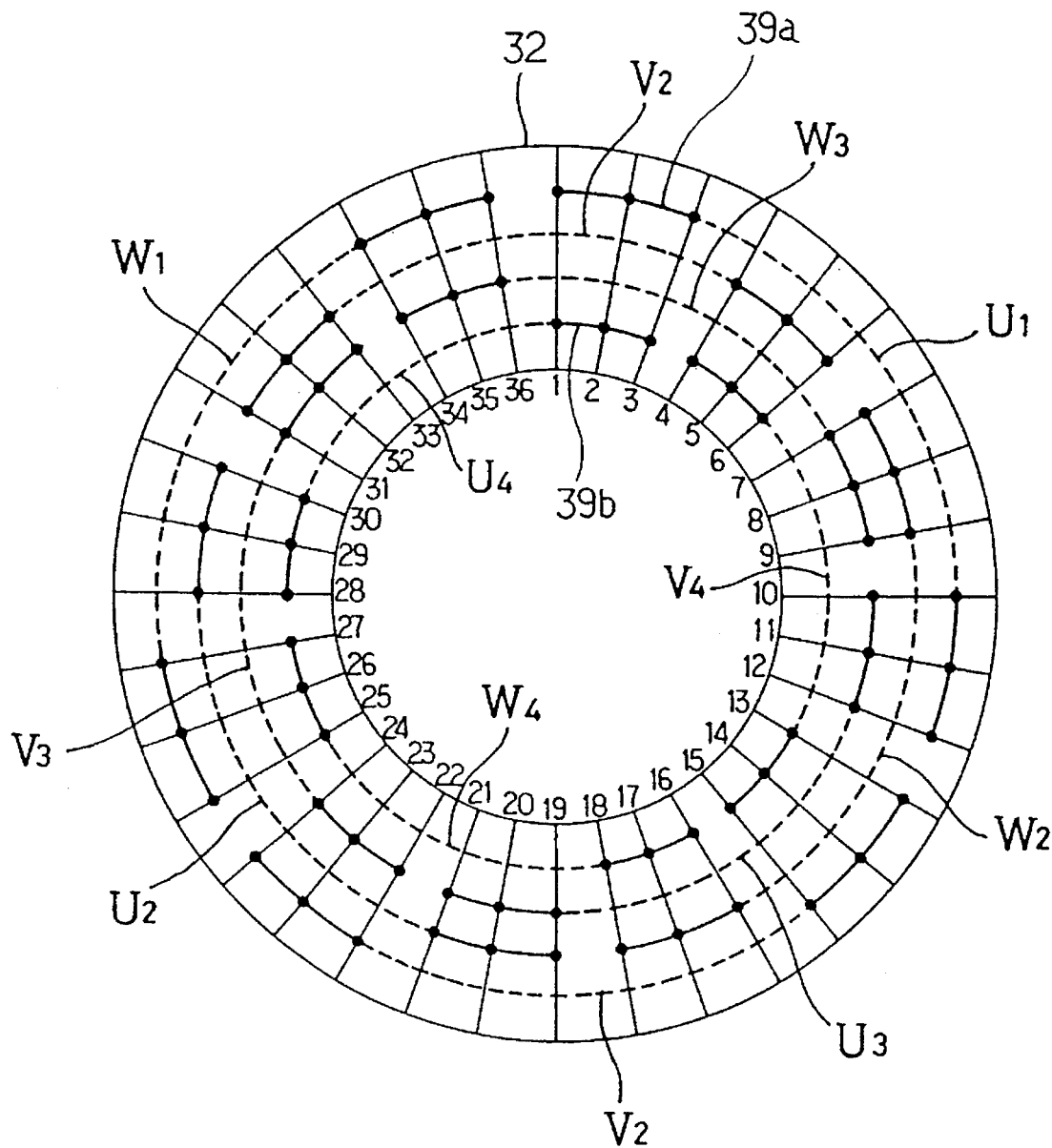
FIG. 14 illustrates a winding pattern applied in the first embodiment.

The operation of the coil inserting apparatus will be described. In the operation, coils 39a and 39b, the wedge 34 and the layer insulator 35 will be inserted into each one of the slots 33, as shown in FIG. 13 so that a four-pole stator core 32 having thirty-two slots is provided with a concentric double-layer winding pattern as shown in FIG. 14. First, the movable rods 22 and 26 of the cylinder 21 and the sub cylinder 25 respectively are moved back to thereby assume the respective positions as shown in FIG. 2, so that the stripper 29 and the pushers 30 are lowered. The layer insulator 35 previously cut into a U-shape is manually inserted into a space between two guides 18 or between the opposite guide faces 36 of the guide 18 and the adjacent guide 18, so that the layer insulator 35 is brought into contact with the first guide faces 36a of the guides 18, as shown in FIGS. 1 and 4. Since the layer insulator 35 is relatively large, it occupies approximately the full space between the guides 18 such that the edges of the layer insulator 35 are engaged with the engaging portions 38 of the guide 18 and the adjacent guide 18. Then, a previously made coil 39a is laid between the blades 16 which are away from each other by the predetermined pitch.

Subsequently, the stator core 32 is fixed by the fixing means at the position as shown in FIG. 2. The cylinder 21 is operated so that the movable rod 22 is moved upwardly, whereupon the carriage 23 and accordingly, the sub cylinder 25, the support 27, the push rod 28, the stripper 29 and the pusher 30 are raised. Consequently, the coil 39a is pushed up by the stripper 29 while the layer insulator 35 is pushed up by the pusher 30, whereby the coil 39a and the layer insulator 35 are inserted into the slot 33 (see FIGS. 4 and 5). In this regard, the layer insulator 35 is slid along the first guide faces 36a of the guides 18, thereby being guided to the slot 33. Since the amount L of projection of each engaging portion 38 is approximately equal to the thickness of each of the wedge 34 and the layer insulator 35, the latter can be guided satisfactorily. Furthermore, the insertion resistance of the coil 39a can be reduced. Additionally, since the inclination α of the distal inclined face 18a of each guide 18 is set in the range of 10 to 30 degrees, a coil end of the coil 39a can be prevented from striking against the guide 18.

Subsequently, when the movable rod 22 of the cylinder 21 is moved backward, the stripper 29 and the pusher 30 are lowered. The fixing means is released from the stator core 32 such that the stator core 32 is detached from the blades 16, whereby the first coil insertion in which the lower coil is inserted in the slot 33 to be located in the bottom of the slot 33 is completed. Thereafter, the coil ends are shaped by a suitable shaping apparatus (not shown).

Insertion of the coil 39b and the wedge 34 will now be described. Referring to FIG. 2, the movable rod 26 of the sub cylinder 25 is previously raised by a predetermined distance. Since the wedge 34 is shorter than the layer insulator 35 in the length, the stroke of the rod 26 previously raised is equal to the difference between the lengths of the wedge 34 and the layer insulator 35 or one half of the difference.

Figure 6:
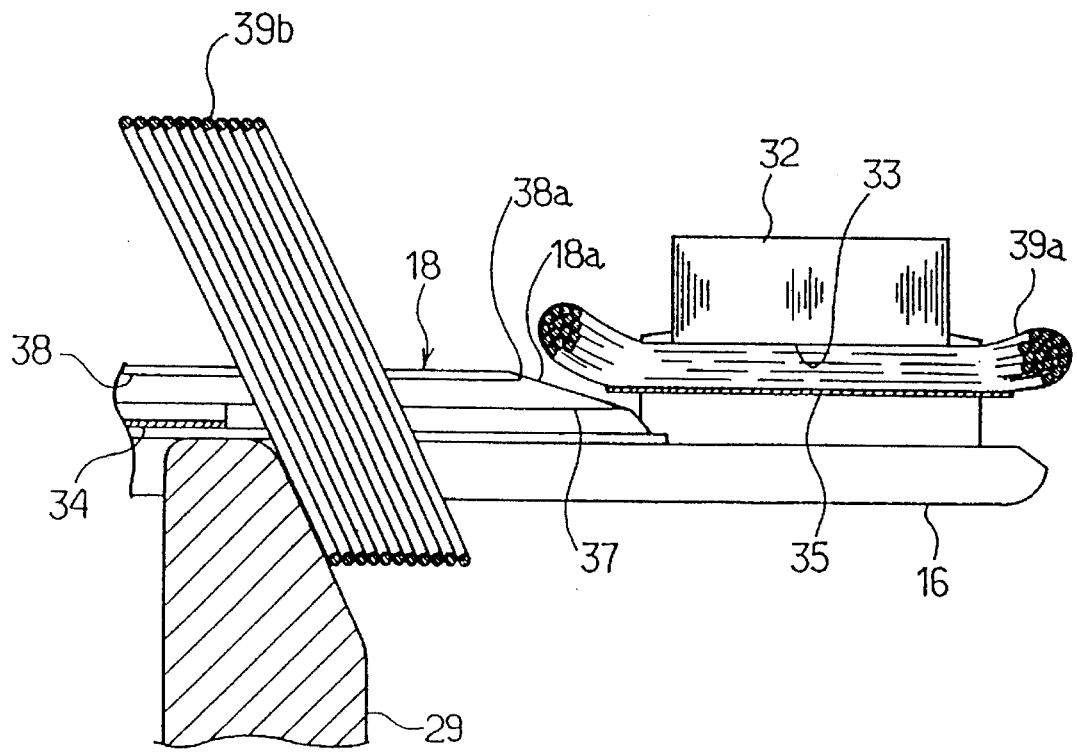
FIG. 6 is a longitudinally sectional side view showing a step subsequent to that shown in FIG. 5.
Figure 7:
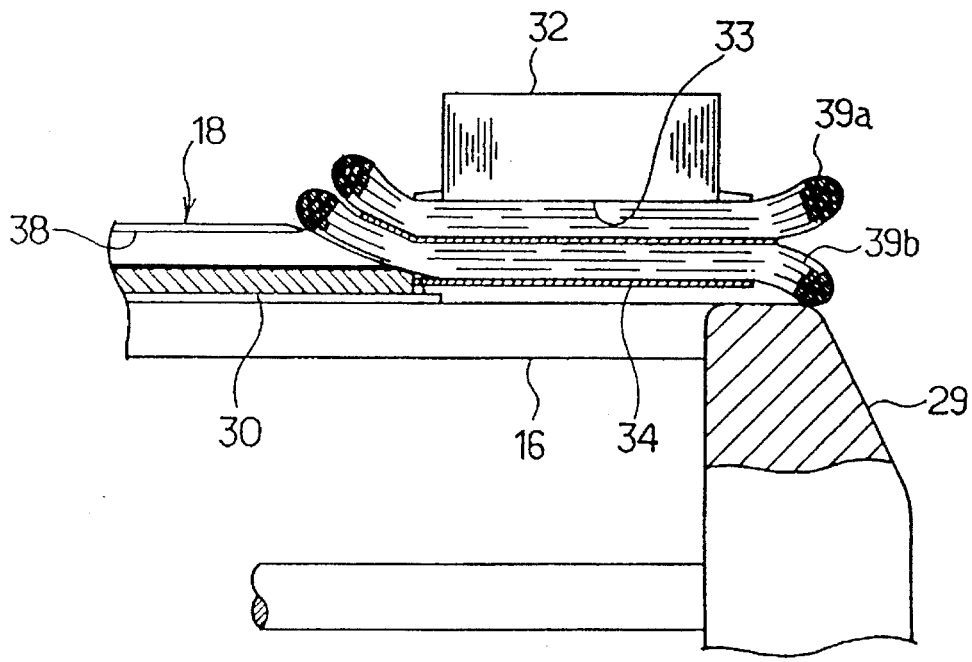
FIG. 7 is a longitudinally sectional side view showing a step subsequent to that shown in FIG. 6.

The wedge 34 previously cut into a U-shape is manually inserted into a space between the opposite guide faces 36 of one guide 18 and the adjacent one, as shown by FIGS. 1 and 6. The upper edges of the wedge 34 are engaged with the engaging portions 37 of the guide 18 and the adjacent guide 18. The coil 39b previously wound is then laid between the blades 16 which are away from each other by the predetermined pitch.

The stator core 32 is fixed by the fixing means to assume the position shown in FIG. 2 and the cylinder 21 is operated to move the movable rod 22 upward. Consequently, the coil 39b and the wedge 34 are raised by the stripper 29 and the pusher 30 respectively, whereby the coil 39b and the wedge 34 are inserted into the slot 33. The coil 39b inserted in the slot 33 serves as an upper coil disposed over the lower coil 39a. See FIG. 7. The wedge 34 is slid along the second guide faces 36b of the guides 18, thereby being guided to the slot 33. Since the amount L of projection of each engaging portion 37 is approximately equal to the thickness of each of the wedge 34 and the layer insulator 35, the wedge 34 can be guided satisfactorily. Furthermore, the insertion resistance of the coil 39b can be reduced.

A set of the coil 39a and the layer insulator 35 and a set of the coil 39b and the wedge 34 are repeatedly inserted into the slots 33 alternately, so that the concentric double-layer winding is formed. As obvious from the foregoing description, the present invention may be applied to the case where a double-layer lap winding is formed.

According to the above-described embodiment, both side faces of each guide 18 serve as the guide faces 36 for guiding both of the wedge 34 and the layer insulator 35. Each guide face 36 has two engaging portions 37 and 38 each extending along the direction of insertion of the coil, the wedge and the layer insulator. The engaging portions 37 and 38 are formed at different locations so as to extend in a direction along the depth of the slot. The ends of the wedge 34 and the layer insulator 35 can be engaged with the engaging portions 37 and 38 respectively even when the sizes of the wedge 34 and the layer insulator 35 differ from each other, so that the wedge 34 and the layer insulator 35 can be guided satisfactorily. Consequently, the replacement of the guides 18 is not required when the sizes of the slot insulators such as the wedge or layer insulator differ from each other.

The contact pressure between the guide 18 and the coil end is decreased with the decrease of the inclination α. However, when the inclination α is too small or below 10 degrees, the distal end 38a (see FIG. 4) of each engaging portion 38 becomes more distant from the slot 33. In this case, the layer insulator 35 is disengaged from the engaging portions 38 at an early stage of the insertion and accordingly, the U-shaped layer insulator 35 spreads outwardly to collide with the end of the stator core 32, which makes it difficult to insert the layer insulator 35 into the slot 33. On the other hand, when the inclination α is too large or exceeds 30 degrees, the layer insulator 35 collides with the coil end, thereby both being damaged. Since the inclination α is set in the range of 10 to 30 degrees in the above-described embodiment, the coil end can be prevented from colliding with the guide 18. Furthermore, the layer insulator 35 can be prevented from colliding with the end of the stator core or another slot insulator.

Figure 8:
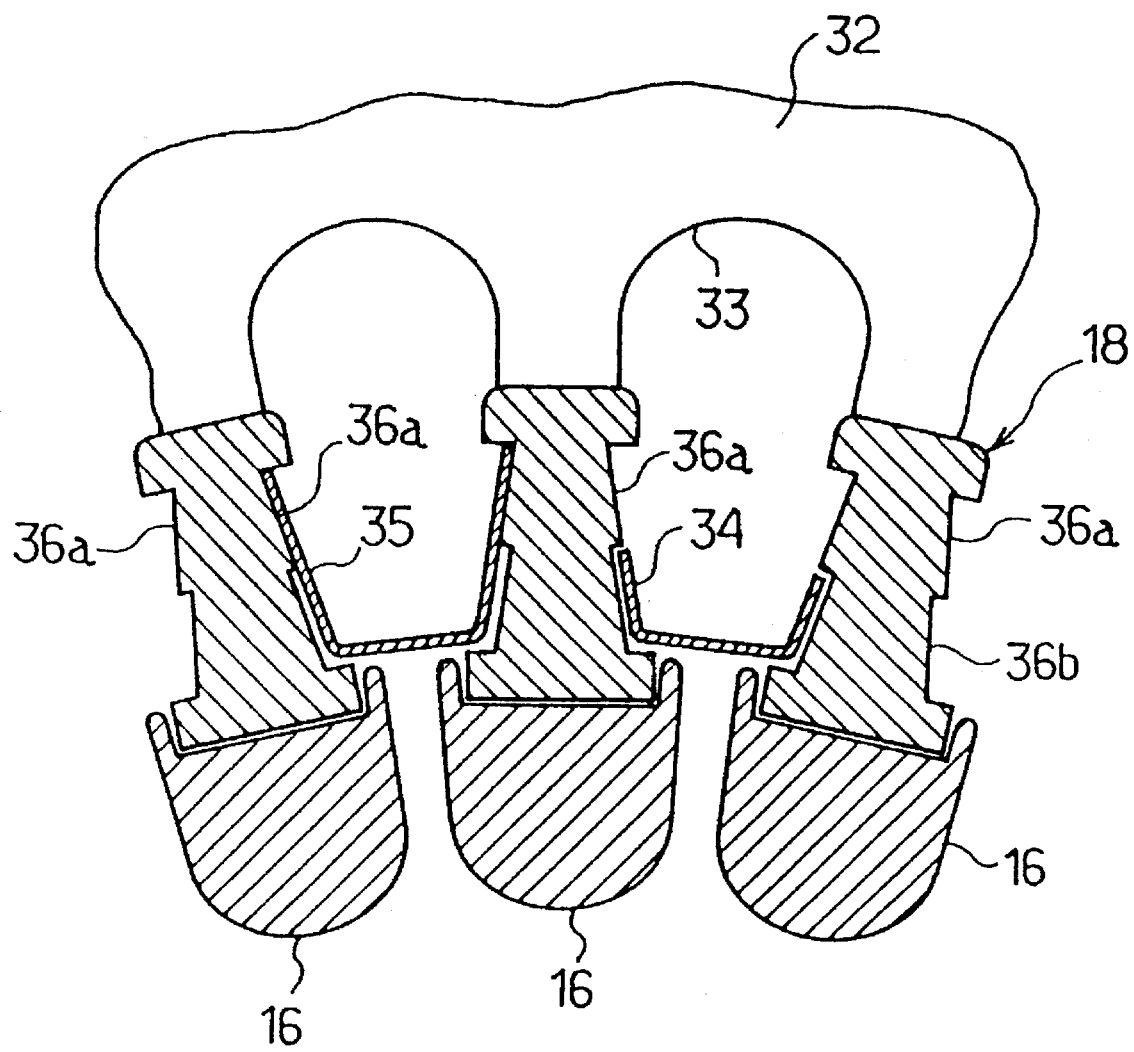
FIG. 8 is a view similar to FIG. 1, showing a coil inserting apparatus of a second embodiment in accordance with the present invention.

Although each guide face 36 includes the first guide face 36a which is generally parallel to its axis, in the foregoing embodiment, the first guide face 36a may be formed to have an inclined face which is the same as that of the second guide face 36b, as shown as a second embodiment in FIG. 8. Furthermore, the number of the engaging portions may be three or above three according to the types of the slot insulators.

FIGS. 9 to 12 illustrate a third embodiment of the present invention. Describing the difference between the first and second embodiments, the sub cylinder 25 is eliminated in the third embodiment and a pusher 43 is provided instead of the pusher 30. The cylinder 21 is mounted on the stationary portion below the base 11 and includes the movable rod 22 on which a carriage 42 is mounted so as to be vertically movable along the guide rods 24. A connecting rod 41 on which the support 27 is mounted is further mounted on the carriage 42.

Figure 10:
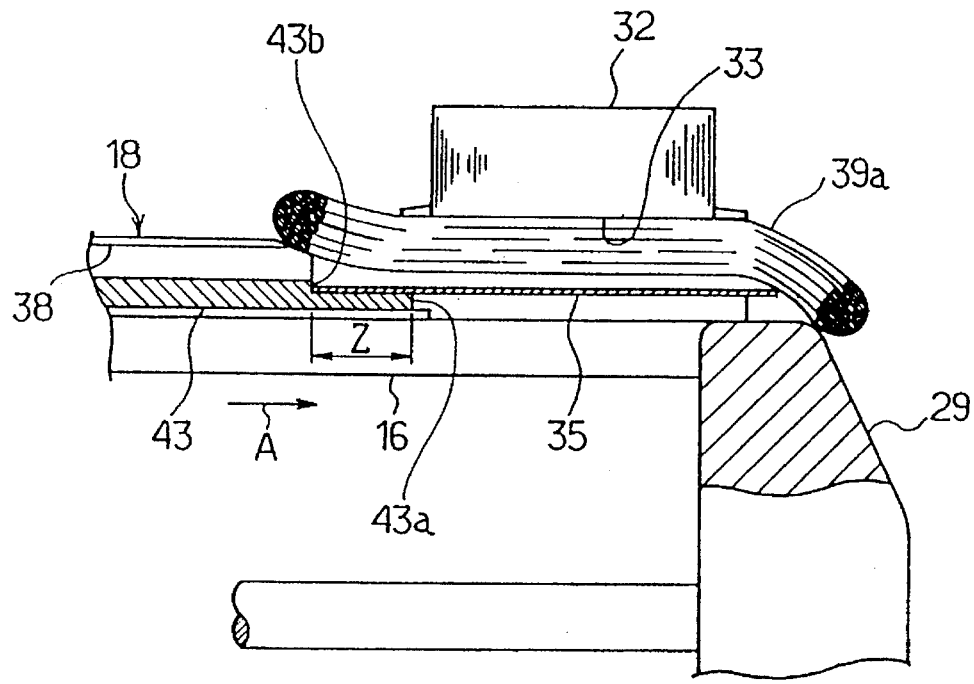
FIG. 10 is a view similar to FIG. 5, showing a step in the third embodiment.
Figure 11:
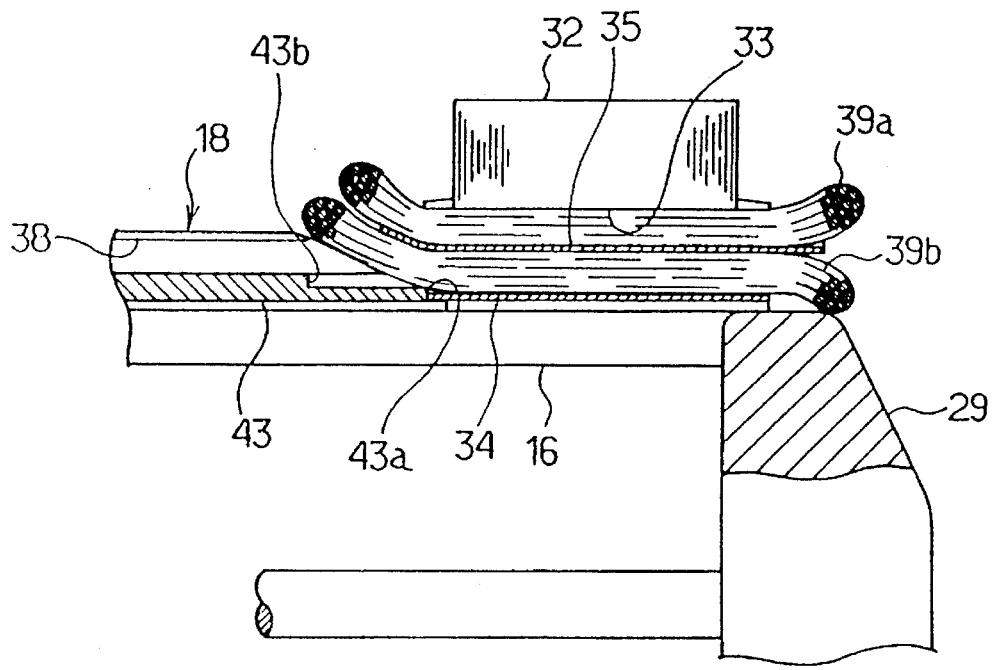
FIG. 11 is a view similar to FIG. 7, showing a step in the third embodiment.

A pusher 43 has a plurality (two in the embodiment) of pushing portions 43a and 43b which are formed to occupy different locations from each other along the direction in which the slot insulators are inserted or in the direction of arrow A in FIG. 10. More specifically, the pusher 43 has in its distal end a stepped portion extending lengthwise thereof or in the direction of the depth of the slot 33. The distal end of the stepped portion serves as the first pushing portion 43a while the rear end of the stepped portion serves as the second pushing portion 43b. The distance Z between the first and second pushing portions 43a and 43b is set to be equal to the difference between the lengths of the wedge 34 and the layer insulator 35 or more desirably, to be equal to one half of the difference.

Figure 9:
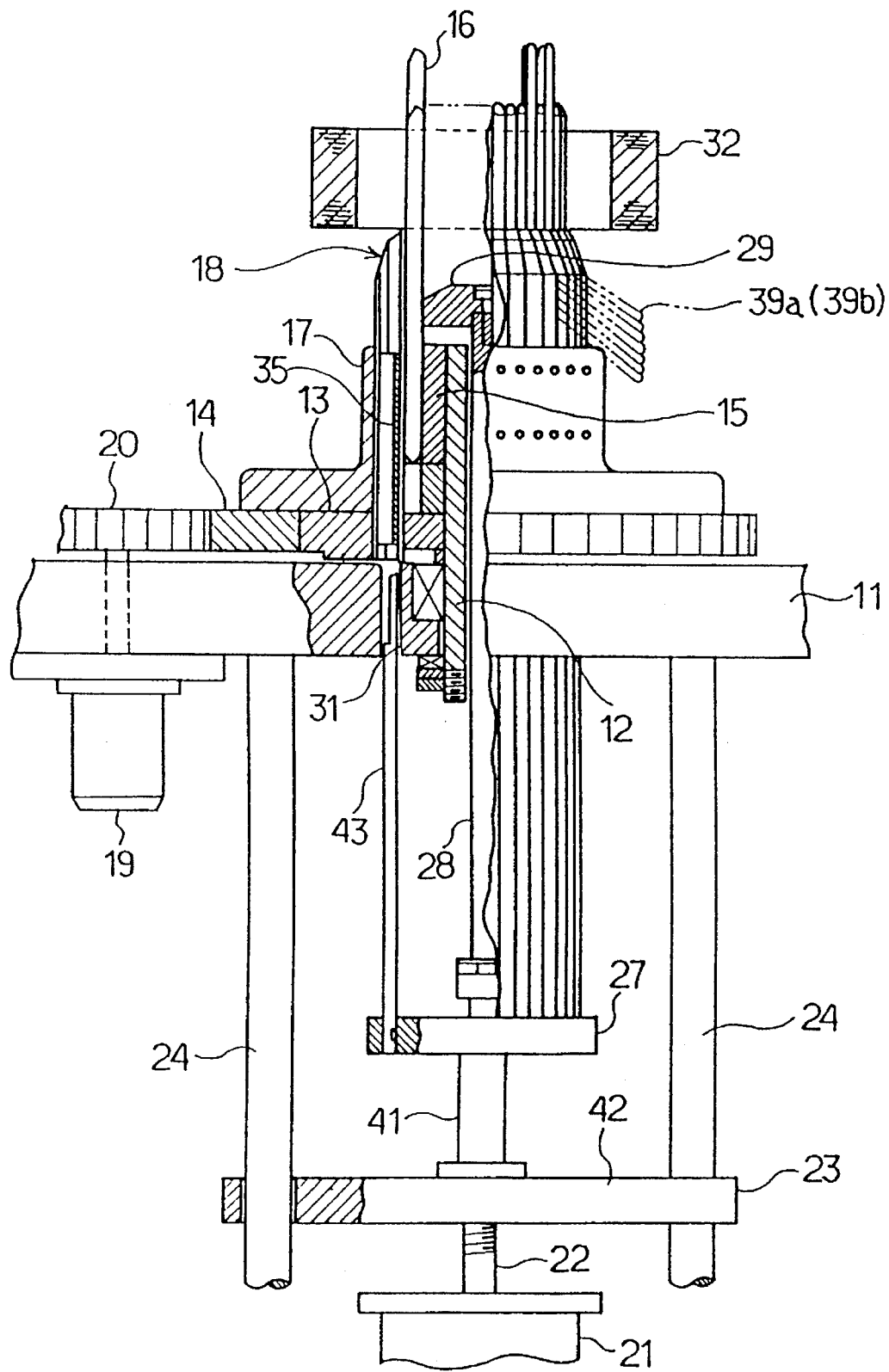
FIG. 9 is a view similar to FIG. 2, showing a coil inserting apparatus of a third embodiment in accordance with the present invention.

The coils 39a and 39b, the wedge 34 and the layer insulator 35 will be inserted into the slot in the following manner. First, the movable rod 22 of the movable cylinder 21 is moved back to thereby assume the position as shown in FIG. 9, so that the stripper 29 and the pusher 43 are lowered. The layer insulator 35 previously cut into a U-shape is manually inserted into the space between two adjacent guides 18 or between the opposite guide faces 36 of the respective guides 18, in the same manner as described above with reference to FIG. 4. The previously wound coil 39a is put between the blades 16. The stator core 32 is then fixed by the fixing means at the position shown in FIG. 9. The cylinder 21 is operated so that the movable rod 22 is moved upwardly, whereby the stripper 29 and the pusher 43 are raised simultaneously. Consequently, the coil 39a is pushed up by the stripper 29 while the layer insulator 35 is pushed up by the pushing portion 43b of the pusher 43, whereby the coil 39a and the layer insulator 35 are inserted into the slot 33 (see FIG. 10). Subsequently, when the cylinder 21 is moved backward, the first coil insertion is completed. On the other hand, when the wedge 34 and the coil 39b are inserted into the slot 33, the wedge 34 is pushed upwardly by the pushing portion 43a of the pusher 43 as shown in FIG. 10.

Figure 12:
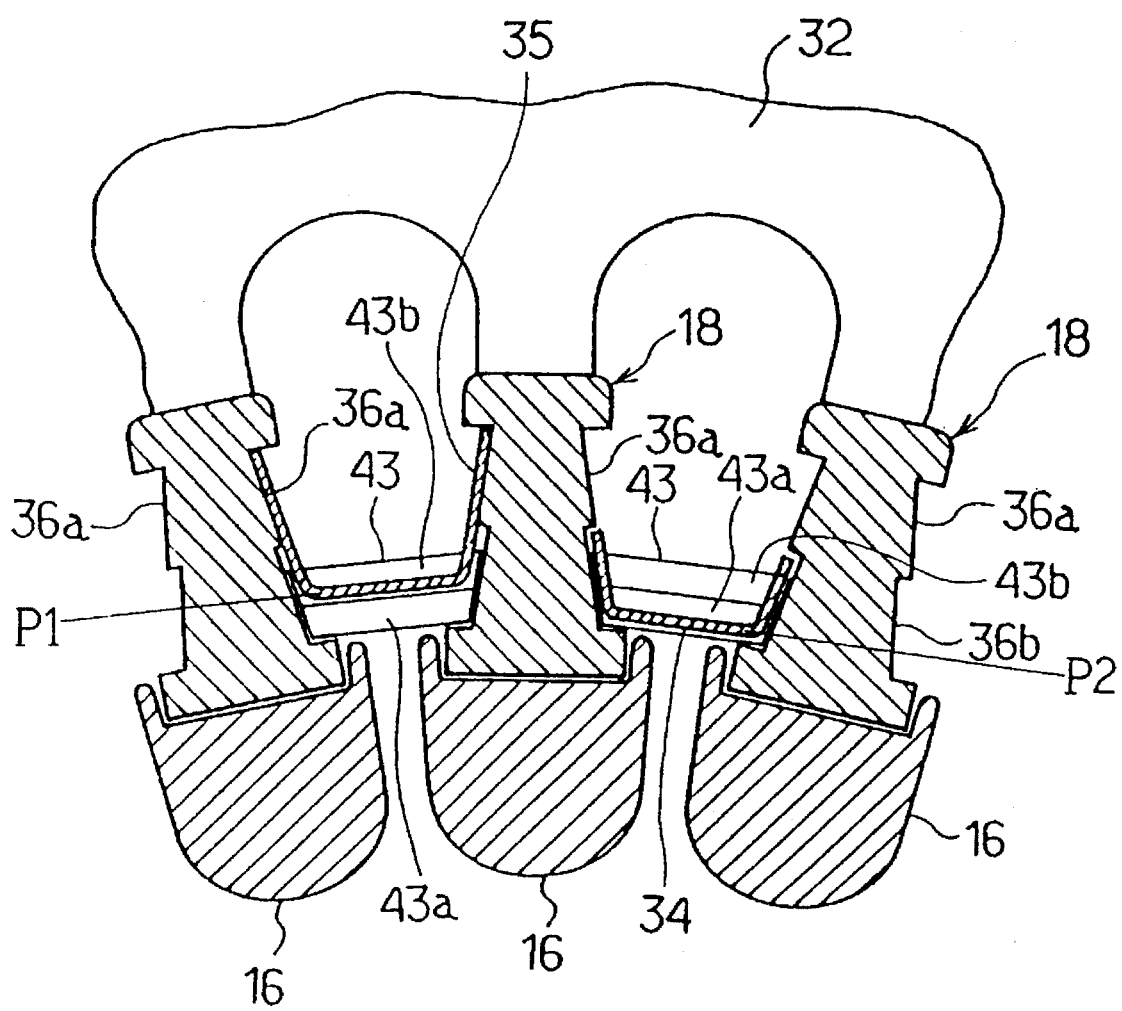
FIG. 12 is a view similar to FIG. 1, showing guides of the coil inserting apparatus of the third embodiment.
Figure 15:
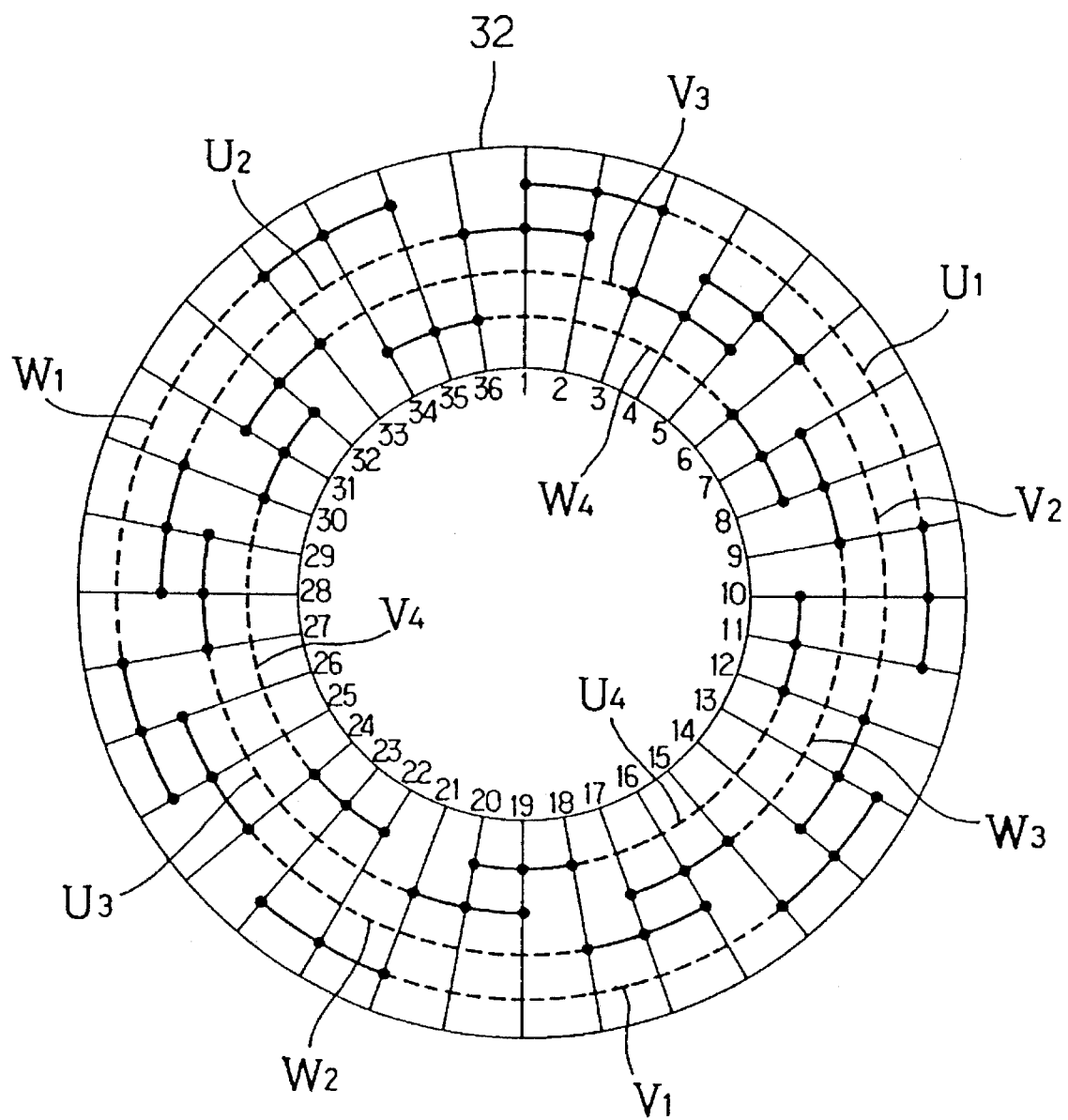
FIG. 15 illustrates another winding pattern.

In a coil V2 in a winding pattern shown in FIG. 15, for example, one coil serves as the upper coil in slot #12 while it serves as the lower coil in slots #13 and #14. In forming the above-described winding pattern, the layer insulator 35 is held on the guide 18 corresponding to slot #12. The wedge 34 is held on the guide 18 corresponding to slots #13 and #14. Since the height of each of the layer insulator 35 and the wedge 34 in a direction along the depth of the slot is previously set at a predetermined value, the difference between a location P1 of the bottom of the layer insulator 35 and a location P2 of the bottom of the wedge 34 is defined as shown in FIG. 12. Upon rise of the pusher 43, the difference between the locations P1 and P2 causes the first stepped portion 43a to collide with the layer insulator 35 while the second stepped portion 43b is caused to collide with the wedge 34. Thus, a single movement of the pusher 43 can complete the coil insertion even when the upper and lower coils are simultaneously inserted.

According to the third embodiment, the pushing portions 43a and 43b are formed in the pusher 43 so as to occupy different locations. The distance Z between the pushing portions 43a and 43b is set to be equal to one half of the difference between the lengths of the wedge 34 and the layer insulator 35. Consequently, the wedge 34 and the layer insulator 35 having different sizes can be inserted into the slots 33 without adjustment of the stroke of the pusher 43. Furthermore, since the sub cylinder 25 provided in the coil inserting apparatus of the first embodiment is eliminated, the construction of the apparatus can be simplified. The adjustment of the location of the layer insulator 35 can readily be performed manually, if necessary, after formation of the coil ends for the insertion of the subsequent phase coils.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

I claim:

1. A slot insulator guide used with a coil inserting apparatus comprising a plurality of blades arranged in a space at a predetermined interval equal to a pitch of slots formed in a stator core of a dynamoelectric machine and each having a bottom and an open end and holding a coil, a plurality of pushers arranged so as to be reciprocally movable and so as to correspond to the blades respectively, the pushers being moved so that a layer insulator and a wedge are pushed into each slot, pusher driving means for moving the pushers, a stripper disposed to be reciprocally moved in a space encircled by the blades, and stripper driving means for moving the stripper so that the coil is pushed by the stripper from the blades into each slot, the slot insulator guide comprising:

(a) a guide face including a first and a second guide faces formed in each of sides thereof so as to be located at the bottom side of each slot and at the open end side of each slot respectively in the state that a plurality of the guides are disposed to correspond to the respective blades; and (b) a first and a second engaging portion formed in each of the sides of the slot insulator guide so as to be located at the bottom side of each slot and so as to extend longitudinally of each slot;

wherein the layer insulator is held between the opposite first guide faces of the guide and the adjacent guide with both edges of the layer insulator being engaged with the first engaging portions of the guides and the adjacent guide respectively;

wherein the wedge is held between the opposite second guide faces of each guide and the adjacent guide with both edges thereof being engaged with the second engaging portions of the guide and the adjacent guide respectively; and wherein the layer insulator and the wedge are guided by the respective first and second guide faces and the respective first and second engaging portions so as to be moved toward the slots of the stator core when the layer insulator and the wedge are pushed by the pushers.

2. A slot insulator guide according to claim 1, wherein the guide has an inclined face formed in the distal end of the first guide faces and an inclination of the inclined face is set in a range of 10 to 30 degrees.

3. A slot insulator guide according to claim 2, wherein an amount of projection of each of the first and second engaging portions projecting from the first and second guide faces respectively is set to be approximately equal to the thickness of each of the layer insulator and the wedge.

4. A coil inserting apparatus for inserting a layer insulator and a wedge together with a coil into each of slots of a stator core of a dynamoelectric machine, comprising:

(a) a plurality of blades arranged in a space at a predetermined interval equal to a pitch of slots formed in a stator core of a dynamoelectric machine and holding a coil, each slot having a bottom and an open end opposite to the bottom;

(b) a stripper disposed to be reciprocally moved in a space encircled by the blades;

(c) stripper driving means for moving the stripper so that the coil is pushed by the stripper from the blades into the slot;

(d) a plurality of guides disposed so as to correspond to the blades respectively, each guide having two guide faces formed in both sides thereof respectively, each guide face including a first and a second guide face formed in each of sides thereof so as to be located at the bottom side of each slot and at the open end side of each slot respectively, each guide face including a first and a second engaging portions formed at the bottom side of each slot to extend longitudinally of each slot, the layer insulator being held between the opposite first guide faces of the guide and the adjacent guide with both edges thereof being engaged with the first engaging portions of the guide and the adjacent guide respectively, the wedge being held between the opposite second guide faces of the guide and the adjacent guide with both edges thereof being engaged with the second engaging portions of each guide and the adjacent guide respectively;

(e) a plurality of pushers arranged so as to be reciprocally movable and so as to correspond to the blades respectively, the pushers being moved so that the layer insulator and the wedge are pushed into each slot, each pusher having a first stepped portion formed at a predetermined position to abut against and push the layer insulator and a second stepped portion formed at a position different from the location of the first stepped portion in a direction of movement thereof to abut against and push the wedge; and (f) pusher driving means for moving the pushers, the layer insulator and the wedge being pushed by the pushers when the pushers are moved by the pusher driving means, so that the layer insulator and the wedge are guided by the respective first and second guide faces and the respective first and second engaging portions so as to be moved toward the slots of the stator core.

5. A coil inserting apparatus according to claim 4, wherein a distance between the first and second stepped portions of each pusher is set to be approximately equal to one half of the difference between the lengths of the layer insulator and the wedge.

* * * * *